Sept. 25, 1928.
E. U. SIENA
VALVE
Filed Sept. 21, 1927
1,685,298
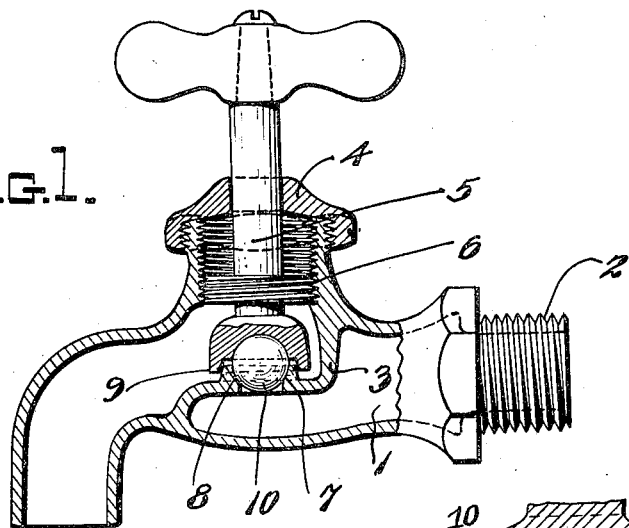
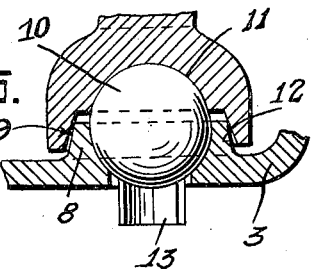
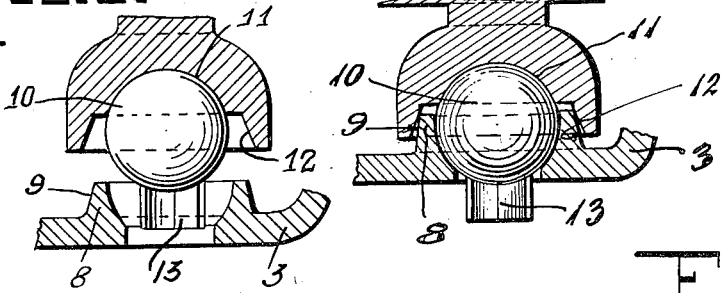
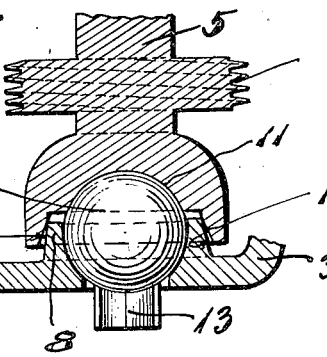
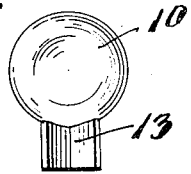
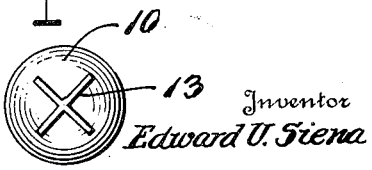
Inventor
Edward U. Siena
By Robb & Robb
Attorneys Patented Sept. 25, 1928.

1,685,298

UNITED STATES PATENT OFFICE.

EDWARD U. SIENA, OF CLEVELAND, OHIO.

VALVE.

Application filed September 21, 1927. Serial No. 221,007.

When the ball of an ordinary ball valve construction has worn down to such an extent that the contacting surfaces of the ball valve seat have become very small in area, the sealing effectiveness of the valve commences to diminish. The applicant, due to long experience in the art of valves, has found that this is particularly true in valves of the type commonly employed in faucets where the continued turning off and on of the faucet wears down the balls very quickly. While it is true that the spherical formation of the ball and valve seat maintain the two in contact as they wear down, they will eventually reach the point when the ball is of less diameter than the opening in the valve seat, whereupon the valve will have become inoperative and the water in the line will run through the faucet unless cut off at some other point. At the period just prior to the reaching of the above-mentioned stage in the life of a valve, the sealing surfaces between the ball and valve seat will have become so small that the functioning of the valve will be very inefficient.

The present invention contemplates overcoming the above disadvantages which are the cause of the short period of usefulness of valves of this type, by decreasing the diameter of a portion of the valve seat as the diameter of the ball becomes smaller, this diminishing of the diameter of a portion of the valve seat commences at the stage in the wearing down of the valve when the sealing surfaces start to grow small in contacting area.

In carrying out this idea, an upstanding conical flange is provided around the valve seat and forms a part thereof. For cooperation with this flange a complemental flange is provided on the valve stem. It will be apparent that as the valve stem is permitted to move downward, due to the wearing of the ball, the conical surfaces of the two flanges will engage and the flange forming part of the valve seat will be contracted around the ball.

A more particular advantage achieved by this invention is the provision of means for shutting off the flow of water through the faucet after the ball has become completely worn out, that is, smaller in diameter than the opening in the valve seat. This is effected by the engagement of the flange on the valve stem with that portion of the partition in the faucet that surrounds the valve seat.

With this and other objects in view as will in part become apparent and in part be hereinafter stated, the invention comprises certain novel constructions, combinations and arrangements of parts as will be subsequently specified and claimed.

For a complete understanding of the invention, reference may be had to the following description and accompanying drawings, in which Figure 1 is a longitudinal cross section through the faucet showing the valve stem in elevation.

Figure 2 is an enlarged detailed view similar to Figure 1 showing a modification of the ball valve.

Figure 3 is a side elevation of the ball valve shown in Figure 2 taken alone.

Figure 4 is a bottom elevation of the valve shown in Figure 3.

Figure 5 is a showing of the valve when worn and the forced conformation of the seat encircling flange thereto.

Figure 6 shows the valve off its seat and its relation to the valve retaining parts.

While the preferred form of the invention is hereinafter described, it is to be clearly understood that I am not to be limited to the exact construction set forth, as various modifications of these details may be provided in it, putting the invention into practice within the purview of the appended claims.

A faucet, with which a valve made in accordance with my invention is particularly adapted to be used, is shown in Figure 1 and is designated by the character 1. While I have shown my valve as availed of in a faucet construction, this valve is capable of use of the most general character and I intend in no way to limit myself to use with a faucet. The faucet 1 is connected to the water line by a screw coupling 2 in the usual manner. A partition 3 in the faucet accommodates the valve structure which will be described more fully in the following paragraphs. A cap 4 surrounds a valve stem 5 which is threaded in the faucet as shown at 6. The faucet above described is of the old and well-known construction, as my invention involves only the valve structure therein.

An opening is provided in the partition 3 that is surrounded by a spherical valve seat 7. This valve seat includes an upstanding flange 8 having the exterior conical surface 9. Cooperating with the valve seat 7 is a ball valve 10 which is of a diameter that provides for its seating in the valve seat.

For cooperation with the ball 10 and flange 8, the lower end of valve stem 5 is enlarged, as clearly shown in Figure 2. This enlarged end includes a recess 11 which receives the ball and the interior conical surface 12. It is notable that I have shown the surface 12 spaced from the surface 9, as these surfaces are not to engage with each other until after the valve has worn down to such an extent that the contacting surfaces of the ball and valve seat commence to diminish in area. When this point has been reached, the surfaces 9 and 12 will contact and, due to the downward movement of the valve stem 5 caused by the rotation thereof and the threaded arrangement at 6, the flange 8 will be contracted around the ball.

In the form of the invention shown in Figure 1, the ball is freely movable in the valve seat. After the valve has been opened permitting the water to flow, this ball will have a tendency to move around so that upon the closing of the valve, new surfaces of the ball will come into engagement with the valve seat whereby this member is evenly worn down.

In Figures 2, 3, 4, 5, and 6 I have shown a modification in which guides 13 are provided on the ball. This is to insure the seating of the ball when it is desired to shut off the flow of water. In the operation of valves of this type, the pressure of the water is depended upon for the removal of the ball from the seat. If the valve stem were raised a sufficient distance, it would be possible for the ball to become removed from the seat, but any possibility of this occurring is completely obviated by the provision of the guide members as shown at 13. Sufficient space is provided between the guide members 13 so as not to impede the flow of the water. These guides may be made integral or separate from the ball as desired.

I do not wish to be in any way limited to the particular materials employed in the construction of my invention, but I have found that the material best suited for the construction of my ball is hard rubber and for the remainder of the faucet and valve construction, ordinary hard brass is productive of the best results.

It is to be noted that after the ball has become completely worn out the flow of water through the opening in the partition will be prevented by the engagement of the flange on the valve stem with the partition. A further sealing effect is obtained by the contact of the conical surfaces 9 and 12. When this action takes place the ball will, of course, have fallen through the opening defining the valve seat.

Having thus described my invention, what I claim as new and desire to secure by Letters Patent of the United States is:—

1. A valve comprising, a valve seat, a ball adapted to cooperate with the seat, and means for contracting a portion of the seat around the ball.

2. A valve comprising, a spherical valve seat, a ball for cooperating with the valve seat, and means for holding the ball in said seat and contracting a portion of the said seat around the ball.

3. A valve comprising, a valve seat, said valve seat including an upstanding flange, a ball for said valve seat, and means for holding the ball in the said seat and contracting the flange around the ball.

4. A valve comprising, a valve seat having an upstanding flange with an exterior conical surface, a ball for the seat, and means for holding the ball in the seat, said means also being adapted to contract the flange around the ball after it has become worn.

5. A valve comprising, a valve seat, a ball for said seat, a valve stem for holding the ball in said seat, and means carried by said valve stem for contracting a portion of the said seat around the ball.

6. A valve comprising, a valve seat having an upstanding flange, a ball for said seat, a valve stem for holding the ball in said seat, and a flange carried by said valve stem cooperating with the flange around the valve seat for contracting the last-named flange around the ball.

7. A valve seat having an upstanding flange, a ball having guides and adapted to engage said seat, and means for holding the ball in said seat and contracting the flange around the ball.

8. A valve comprising, a valve seat, a ball adapted to fit in said seat, and means on the ball for insuring the seating of said ball in the seat during operation of the valve.

9. A valve comprising, a valve seat, a ball for said seat, and means for preventing the flow of water through the valve after the ball has become worn out to such an extent that it is no longer in engagement with the seat.

10. A valve comprising, a valve seat having an upstanding flange, a ball for said seat, and means for holding the ball in said seat, said means also being adapted to contract the flange around the ball and further act as a means for preventing the flow of water through the valve after the valve is no longer in engagement with the seat.

11. A valve comprising, a valve seat having an upstanding flange with an exterior conical surface, a ball for said seat, a valve stem for holding the ball in the seat, and a flange having an interior conical surface on the stem, said flange being adapted to contract the first-named flange around the ball and further act as means for preventing the flow of water through the valve when the ball has become worn out so that it is no longer in engagement with the seat.

12. A valve of the class described, comprising in combination, a valve seat, a valve member adapted to cooperate with the seat, and means for contracting a portion of the seat around the valve member.

13. A valve of the class described, comprising, in combination, a valve seat including an upstanding flange, a valve member for said valve seat, and means for holding the valve member in said seat, said means also constituting a means for contracting the flange around the valve member.

14. A valve of the class described, comprising, in combination, a valve seat, a valve member for the seat, a valve stem for holding the valve member in the seat, and means carried by the valve stem for contracting a portion of the seat around the valve member.

15. A valve of the class described, comprising, in combination, a valve seat, a valve member for said seat, and means for preventing the flow of water through the valve after the valve member has become worn to such an extent that it is no longer in operative engagement with the seat.

In testimony whereof I affix my signature.

EDWARD U. SIENA.